S. JOYCE.

Spring-Hinges.

No. 6,112. Reissued Nov. 3, 1874.

WITNESSES:

Gustave Dieterich

A. F. Perry

INVENTOR:

S. Joyce

BY Munn & Co

ATTORNEYS.

THE GRAPHIC CO. PHOTO-LITH. 39 & 41 PARK PLACE, N.Y.

UNITED STATES PATENT OFFICE.

STEPHEN JOYCE, OF NEW YORK, N. Y.

IMPROVEMENT IN SPRING-HINGES.

Specification forming part of Letters Patent No. 142,855, dated September 16, 1873; reissue No. 6,112, dated November 3, 1874; application filed August 29, 1874.

*To all whom it may concern:*

Be it known that I, STEPHEN JOYCE, of the city, county, and State of New York, have invented a new and useful Improvement in Spring-Hinges, of which the following is a specification:

The invention will first be fully described, and then pointed out in the claim.

Figure 1:
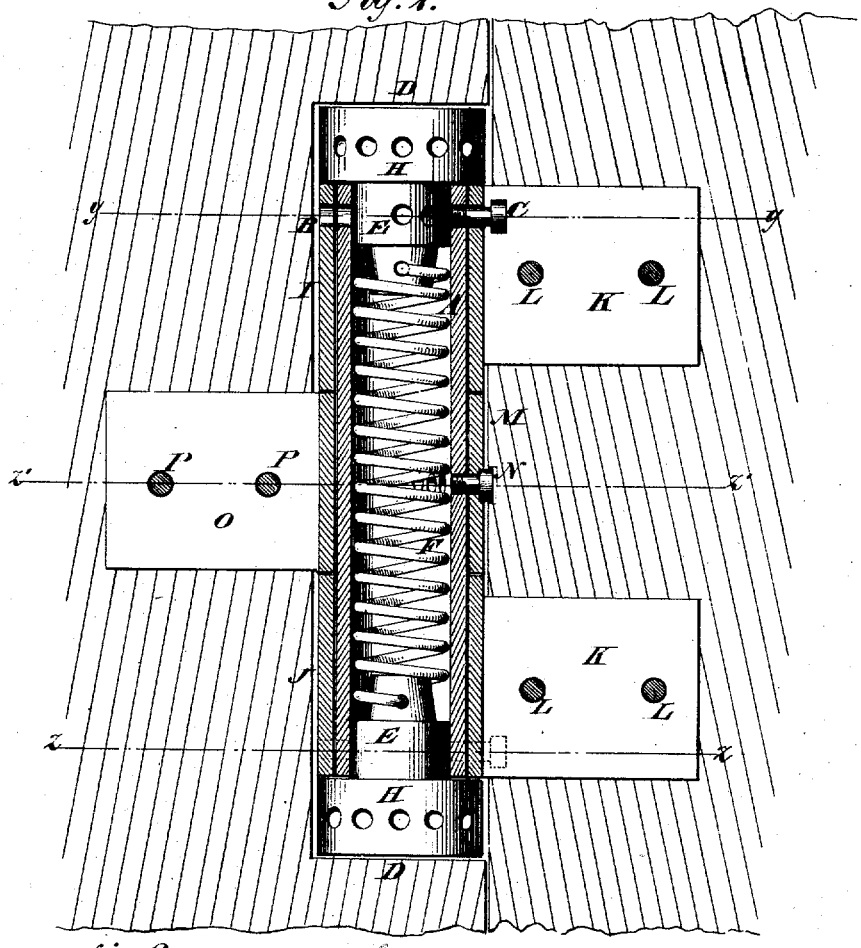
Figure 2:
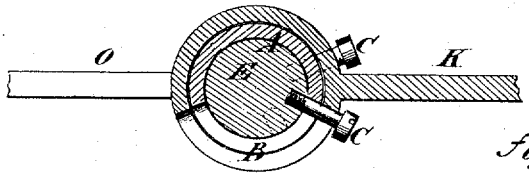
Figure 3:
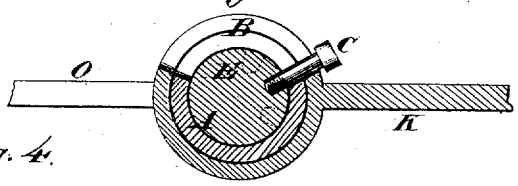
Figure 4:
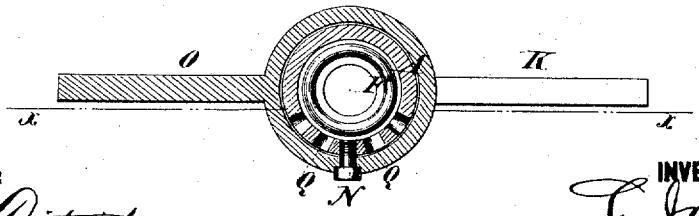

In the accompanying drawing, Figure 1 is a longitudinal section of the tubular pintle and surrounding bands or sleeves, showing the heads or plugs and spiral springs. Fig. 2 is a horizontal section of Fig. 1 taken on the line *y y*. Fig. 3 is a horizontal section of Fig. 1 on the line *z z*. Fig. 4 is a horizontal section of Fig. 1 taken on the line *z′ z′*.

Similar letters of reference indicate corresponding parts.

A is the tubular pintle, having a transverse slot, B, at each end, which cuts the pintle about one-third its circumference, and is sufficiently broad to admit the tension and stop pins or screws C C. The slot B is also made in the end bands or sleeves I and J. D D are heads, which project from the ends of the pintle, a portion of which, E, enters the pintle and receives the stop-screws C. The plugs E engage with the ends of the spring F, and the proper tension to the spring is given and maintained by turning these parts E, and inserting the stop pins or screws to act as stops to limit the swing of the door. The bands or sleeves I and J are each provided with a leaf, K, which enters the casing or door, and is fastened by screws through holes L. The stop-pins C C strike these leaves when the door is swung, one being on one side and the other on the other side, as indicated in the drawing, the lower one being seen in dotted lines. M is the central band, which is fastened to the pintle by the screw N. O is the leaf of the central band, which is fastened to the door or casing by means of screws through the holes P. These leaves go into mortises in the middle of the casing and the door, and the latter is allowed to open in either direction, so as to make at least a full opening, and when the hinge is thus attached sufficient tension is given to the spring to close the door when swinging from either direction. The swinging and closing of the door are regulated by means of the screw N, which is adjusted to the proper one of a series of holes, Q, as seen in Fig. 4.

Having thus described my invention, I claim as new, and desire to secure by Letters Patent—

The hinge-pintle A, made tubular, arc-slotted at the end, and containing an internal spring, F, combined with two heads, D D, as shown and described, so that, when rotated, one head will be carried while the other will remain at rest, according to the direction in which the tubular pintle turns.

STEPHEN JOYCE.

Witnesses:

C. SEDGWICK,

ALEX. F. ROBERTS.